2,826,604

PREPARATION OF DECAHYDRONAPHTHYL ACETATE

William E. Erner, Wilmington, Del., assignor to Houdry Process Corporation, Wilmington, Del., a corporation of Delaware No Drawing. Application June 2, 1955
Serial No. 512,853

2 Claims. (Cl. 260—488)

The present invention relates to the preparation of 1-decahydronaphthyl alcohols and the corresponding acetic acid ester and ketone derivatives of said alcohols.

More particularly the invention is concerned with the production of saturated polynuclear carbocyclic compounds of the type

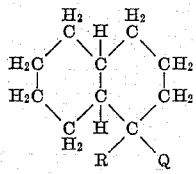

wherein R represents hydrogen and Q represents a hydroxy, or acetoxy group, or R and Q together represent a keto group. This structure may also be written

D—Q wherein D represents the decahydronaphthalene residue to which —OH,

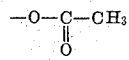

or =O is attached at an alpha carbon.

The invention is based on the novel discovery that aceto-oxidation of certain bicyclic naphthenes under controlled conditions and in the presence of oxidation catalysts, results in the formation of acetic acid esters. The obtained esters can readily be transformed by hydrolysis to the corresponding secondary alcohols which in turn are capable of being converted to their corresponding ketones.

The invention finds particular applicability in the conversion of a technical grade of decahydronaphthalene (for example, a solvent marketed by E. I. du Pont de Nemours of Wilmington, Delaware, under the "Decalin" trademark) to 1-decalyl acetate, which ester is transformed by alkaline hydrolysis to 1-decalyl alcohol. Catalytic oxidation of the alcohol yields decalone-1.

Naphthalene, in the past, has found extensive use as a moth-repellent and as a starting material in the manufacture of phthalic acid. Newer moth-repellent products and newly-developed processes for production of phthalic anhydrides have introduced important competition in the market demand for naphthalene. Moreover, the present expansion of petroleum reforming has led to increased production of naphthalene and its homologues to the extent of presenting a growing problem in their marketing.

In an extensive investigation of new uses for naphthalene and hydrogenated naphthalenes, attempts were made to convert Decalin by the Criegee rearrangement technique as a step in sebacic acid synthesis. These attempts did not meet with desired success. During the course of the investigation, however, it was found that decalyl acetate was formed by oxidizing a mixture of Decalin and acetic anhydride at the reflux temperature (130–140° C.), the decalyl acetate being recoverable from the reaction mixture by distillation of the neutralized reaction liquid. The recovered product was a straw-colored fragrant oil, which was established to be 1-decalyl acetate. The position of the acetoxy group was determined by hydrolysis of the ester to the alcohol and subsequent conversion to decalone-1 by chromic acid-acetic acid oxidation.

The aceto-oxidation of Decalin can be carried out in the presence of oxidation catalysts of the type embodied in the metal salts of the lower fatty acids. Cobalt acetate proved outstanding among the metallic-soap oxidation catalysts studied. The use of benzoyl peroxide at the start of the process has been found advantageous in decreasing the induction period and in giving uniformly high yields.

The ratios of Decalin to acetic anhydride in the operation of the process are not critical, but practical considerations favor the use of at least one-half mol of acetic anhydride per mol of Decalin. Best operating results are obtained at a weight ratio of Decalin to acetic anhydride of between about 10:6 and 10:9. Too high a ratio of acetic anhydride, for instance in excess by weight of the Decalin, leads to processing difficulties in separation of the product from the reaction mixture and also tends to produce side products such as decalyl diacetate. Too low a ratio of acetic anhydride favors excessive oxidation of the Decalin charge with consequent formation of undesired oxidation products, as will hereinafter appear.

The oxygen sparging rate must be carefully controlled at least from the time that the exothermic reaction becomes self-sustaining to its completion. Oxygen starvation leads to the formation of undesired colored gums. The oxygen addition rate during the course of a run reaches a maximum when the reaction rate is greatest and as the reaction slows down, the oxygen rate is correspondingly decreased. With efficient oxygen sparging and proper catalyst the reaction time for optimum results was found to be about six hours. Acetic acid cannot be used in the process as a substitute for the anhydride.

In the cobalt acetate catalyzed reaction, the sudden formation of a blue-black coloration throughout the reaction mixture when the reaction begins has been observed in all cases where high yields of decalyl acetate were obtained. The color tends to fade during the course of the reaction.

The process can be operated using commercial decahydronaphthalene which contains about equal parts of the cis- and trans-isomers (and contains a small amount of unreduced tetrahydronaphthalene as an impurity), or it may be selectively applied to either of the isomers. The cis-decahydronaphthalene was found to react considerably faster than the trans-isomer.

Disregarding polar and equatorial forms, there are four geometric isomers of 1-decalyl acetate: cis-cis-cis, cis-trans-cis, cis-cis-trans, and cis-trans-trans. The product obtained from commercial Decalin appears from its physical and chemical properties to be a mixture of these isomers. Cobalt catalysis appears to favor the formation of the second and fourth isomers.

The major product of the reaction, 1-decalyl acetate, has been briefly mentioned in the literature (Leroux: Comptes Rendus, vol. 141, p. 953) but no practical process for its production or for that of the corresponding alcohol, has heretofore been known. It is a straw colored mobile liquid with a characteristic odor, the mixed isomers obtained boiling at 110–115° C. at 3 mm. pressure. It has a refractive index of about $n\ 25/D$ of 1.4768, and specific gravity 20/4 of 1.035. It is saponified by refluxing with aqueous-alcoholic caustic for about 24 hours and the resulting decalol-1 isomers are readily isolated thereafter by distillation under reduced pressure. The mixture of isomeric alcohols obtained boil at 111 to 116° C. under a pressure of 2 mm.

1-decalyl acetate is resistant to attack by oxidizing agents such as alkaline permanganate, chromic acid, and warm nitric acid. Under strong oxidation complete destruction of the molecule usually results. By passing 1-decalyl acetate over activated alumina it is converted to a mixture of octalins, acetone, water and carbon dioxide.

Oxidation of the alcohol, decalol-1, can be more readily controlled. Thus, mild oxidation of the alcohol mixture yields decalone-1. By nitric acid oxidation of decalol-1 there was obtained a mixture of products composed chiefly of dicarboxy acids including 2,7-dehydrosebacic acid (40%), glutaric acid (25%) and adipic acid (4%).

EXAMPLE I

The reaction was carried out in a resin kettle equipped with a centrifugal stirrer, a thermowell, and a fritted glass sparging tube for introduction of oxygen gas. A reflux condenser connected to the kettle led to an absorption train for removal of carbon dioxide, carbon monoxide and water. The kettle was charged with 875 parts by weight of commercial Decalin and 525 parts acetic anhydride (of 90–95% purity).

The mixture was stirred, and 3 parts by weight of benzoyl peroxide was sprinkled in through the thermowell neck, followed by 22 parts of finely ground cobalt acetate (=3 parts Co). The thermowell was then set in place and oxygen sparged through the stirred mixture at the rate of .0035 cu. ft./min. per 1.4 kg. of the Decalin plus acetic anhydride. The external heating mantle surrounding the kettle was then set in operation and in about 20 minutes the temperature of the mixture reached 88° C. At this time the reaction mixture turned blue-black and all the oxygen passing through the system was absorbed including that above the liquid in the kettle. The oxygen flow rate was then increased to about 0.04 cu. ft./min. per 1.4 kg. of original reactants, at which rate 90% absorption could be achieved.

The mean temperature continued to rise and the heater current supply was discontinued at 96° C. The reaction then continued exothermically at about 130° C., the reflux temperature, for its duration of about eight hours. The product was distilled at 35 mm. pressure until only one layer (Decalin) distilled. The residue was then neutralized by percolation through Celite supported sodium hydroxide and further distilled to yield 422 parts by weight of decalyl acetate or about 44 mol percent based on acetic anhydride.

The above reaction with cobalt acetate catalyst was repeated in a number of different runs at 130° C., using various ratios of acetic anhydride to Decalin, with the results shown in the following table obtained in 6 to 8 hour reaction time:

Table 1

| Decalin (pts. by wt.) | Ac₂O (pts. by wt.) | Percent Decalyl Acetate Based on Dry Oil | Mol Decalyl Ac/Mol Decalin/hr. × 10² |
|---|---|---|---|
| 1 | 0.4 | 23.7 | 3.66 |
| 0.875 | 0.525 | 34 | 4.25 |
| 0.790 | 0.710 | ¹ 16.8 | 2.04 |
| 1.750 | 1.050 | 12.2 | 2.32 |
| 1.750 | 1.050 | 18.3 | 2.50 |

¹ 4.4 mole percent/Decalin of decalyl diacetate was also formed in this run: B. P. 180–200° C. at 30 mm., m. w. 247 (ebullioscopic).

The results obtained by the substitution of other metallic catalysts for cobalt acetate are compared in the following table, using a ratio in each run of 10 parts Decalin to 4 of acetic anhydride.

Table 2

| Catalyst | Temp., °C. | Time, Hrs. | Percent Decalyl Acetate (Based on Dry Oil) |
|---|---|---|---|
| Cobalt Acetate | 130 | 6.5 | 23.7 |
| Cobalt Naphthenate | 130–140 | 44 | 14.1 |
| Iron Phthalocyanine | 130–140 | 24 | 2.3 |
| Mn Naphthenate | 130–140 | 20 | 2.0 |
| Red Lead (Pb₃O₄) | 125–140 | 23.75 | 9.1 |
| Ni Naphthenate | 130–140 | 44 | 11.7 |

The metallic salt can be introduced into the reaction mixture as a finely divided powder or it may be dispersed in either reactant. Cobalt shows the best activity particular in the form of its acetate. While the presence of benzoyl peroxide is not absolutely necessary to the progress of the reaction, it is advantageously employed at the start of the reaction, since it reduces the induction period and leads to uniform results and constantly high yields.

EXAMPLE II

Conversion of the decalyl acetate to the alcohol was effected by adding a solution (about 190 g./l.) of caustic soda in 80% ethyl alcohol to the decalyl acetate using 1 mol caustic (NaOH) per 0.9 mol decalyl acetate and heating under reflux for 22 hours. After cooling the reaction mixture, the supernatant liquid decanted from the residue was fractionated under reduced pressure obtaining 91% of the theoretical yield of 1-decalyl alcohol boiling under 10 millimeters' pressure at 125–130° C.

EXAMPLE III

Two parts by weight of 1-decalyl alcohol were added to three parts chromic acid dissolved in glacial acetic acid (200 g./l.). The solution was cautiously warmed to 40° C. The chromic acid solution was reduced to green chromium oxide. The reaction liquid was poured into about 3 volumes water and the aqueous mixture neutralized with sodium bicarbonate and extracted with ether.

The dried ether extract upon distillation yielded a fragrant oil (in an amount approximately half by weight of the starting decalyl alcohol), which was identified as decalone-1 by conversion to the oxime, M. P. 150–6°C.

By the processes of the present invention decalyl alcohol and its simple direct derivatives are made available as new industrial commodities. Decalin obtained by direct hydrogenation of naphthalene provides a sufficiently inexpensive starting material. Except for specialty uses where unique physical properties are demanded, decalyl alcohol can be used to replace cyclohexanol as a solvent in gum and wax compositions with the advantages of its higher carbon content, and generally in detergent and wetting compositions employing higher alcohols such as lauryl and the alcohols conventionally obtained by the Oxo process. Decalyl alcohol is related in structure and certain of its properties to borneol and the terpene alcohols, while the decalone-1 is structurally related to camphor. Thus, decalyl alcohol as well as its acetic acid ester, and other simple carboxylic acid esters thereof, because of miscibility with perfuming agents and their characteristic odoriferous properties, find use in perfume compositions as synthetic "aromatics," extenders, tempering agents, and modifiers to replace, wholly or partly, the related geraniol and isopulegol type compounds. A typical perfume composition of the rose oil type employing both decalol and decalyl acetate comprises:

| | Parts by weight |
|---|---|
| Rhodinol | 45.5 |
| Geraniol | 4.5 |
| Geraniol acetate | 1.0 |
| Citronellal | 9.0 |
| Phenylethyl alcohol | 9.0 |
| Nerol | 4.5 |
| Decalyl acetate | 2.0 |
| Decalyl alcohol | 9.0 |
| Aldehyde C-8 (10%) | 3.5 |
| Aldehyde C-9 (10%) | 3.5 |
| Benzophenone | 5.0 |
| Essence of styrax FFS | 3.5 |

Increase in the proportion of esters in the above composition adds a green fresh note. For use in perfumed soaps, the expensive rhodinol may be omitted and replaced by increased proportions of aldehydes and the other named alcohols.

Decalyl alcohol and acetate are useful as high boiling solvents for semi-polar compounds in which advantage can be taken of the condensed ring structure for special solvent formulations.

Decalone-1 can be used to replace camphor and its derivatives and related compounds as a plasticizer in synthetic resin and cellulose plastic compositions in about the same proportions as camphor is used. Decalyl alcohol and decalyl acetate will increase the water absorption properties of oils, fats and waxes. Thus, about 4% of the alcohol may be advantageously added for that purpose to petrolatum compositions. About 1 to 5% decalyl alcohol added to hydrogenated peanut oil raises the water absorption of the oil markedly. The relation of the decalyl compounds to camphor and citronellal and noted properties suggest possible uses in insect repellants.

As indicated above, decalyl alcohol or acetate can be used as an intermediate for the production of valuable dicarboxy acids.

Obviously many modifications and variations of the present invention as hereinbefore set forth may be made without departing from the spirit and scope thereof and therefore only such limitations should be imposed as are indicated in the appended claims.

What is claimed is:

1. The method of producing 1-decahydronaphthyl acetate which comprises oxidizing liquid decahydronaphthalene with oxygen in the presence of from 0.6 to 0.9 part of acetic anhydride per part of decahydronaphthalene and in the presence of cobalt acetate at reflux temperature, distilling the reaction mixture at reduced pressure to drive off acetic acid and a portion of the decahydronaphthalene, neutralizing the residue to remove traces of acid, and distilling the neutralized residue at reduced pressure to recover 1-decahydronaphthyl acetate.

2. The method of producing 1-decahydronaphthyl acetate which comprises the step of oxidizing liquid decahydronaphthalene by treatment with oxygen containing gas in the presence of liquid acetic anhydride, at about the reflux temperature of the liquid reaction mixture, said oxidation treatment being catalyzed by the presence of a metallic soap oxidation catalyst.

References Cited in the file of this patent

Leroux: Comptes Rend. 141 (1905), pp. 953–4.
Beilstein: Handbuch, v. 6 (1923), pp. 596–7.
Cope et al.: J. Am. Chem. Soc. 72 (1950), pp. 3062–8.
Dauben et al.: J. Am. Chem. Soc. 76 (1954), 4420–6.